J. B. SEELY.
CAR TRUCK.
APPLICATION FILED OCT. 6, 1909.
953,555.
Patented Mar. 29, 1910.
5 SHEETS—SHEET 1.
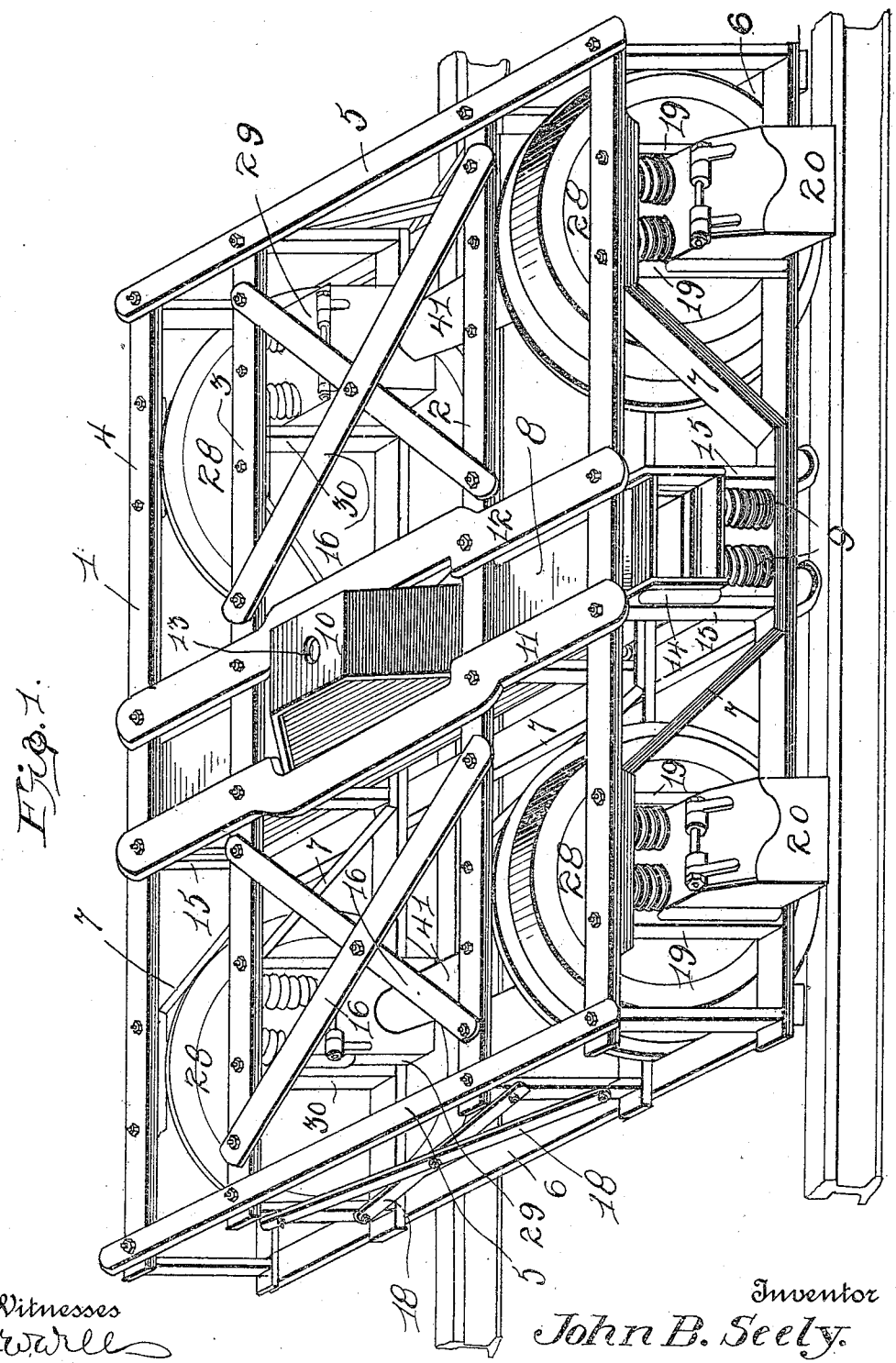
Witnesses
Inventor
John B. Seely.
By his Attorney

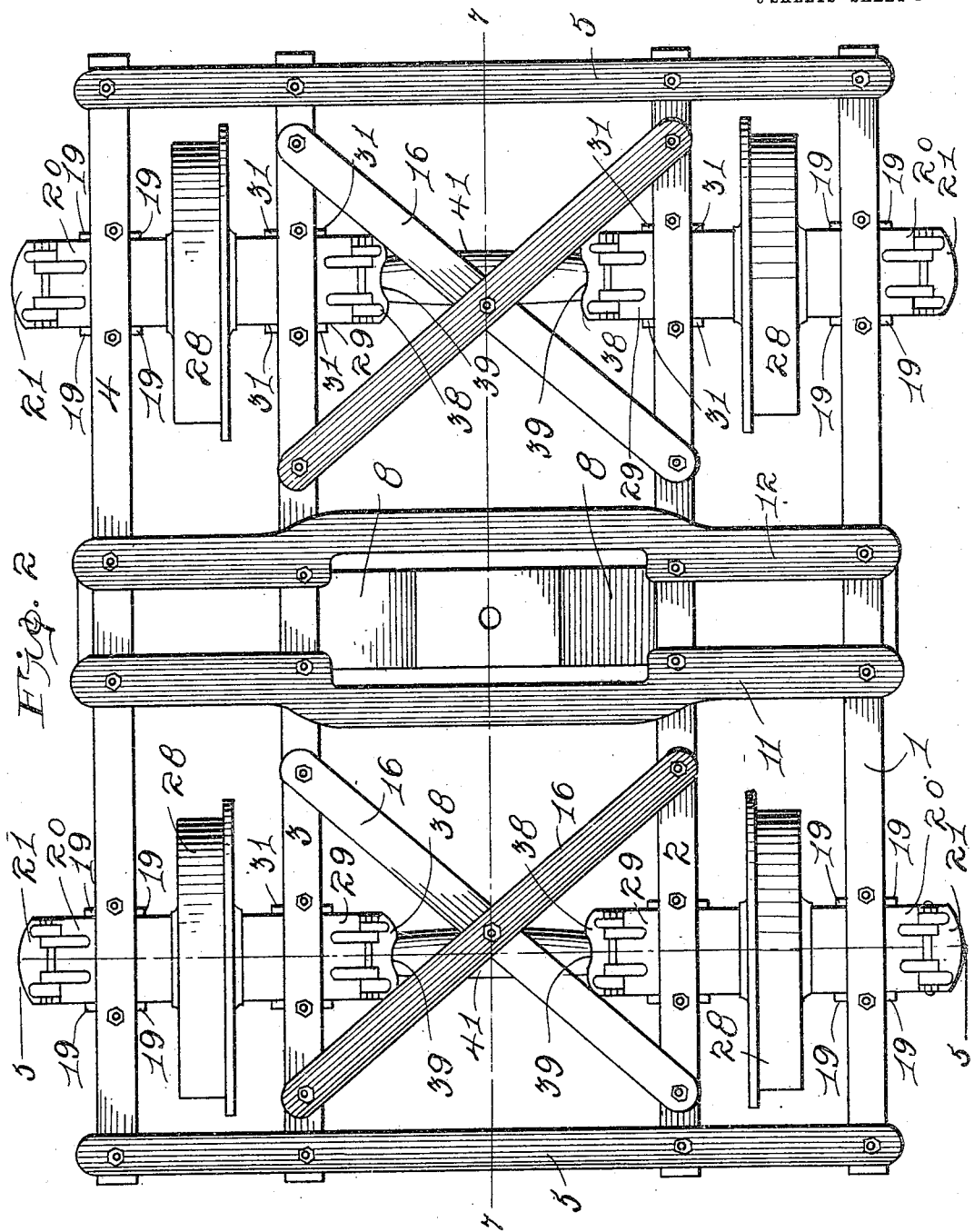

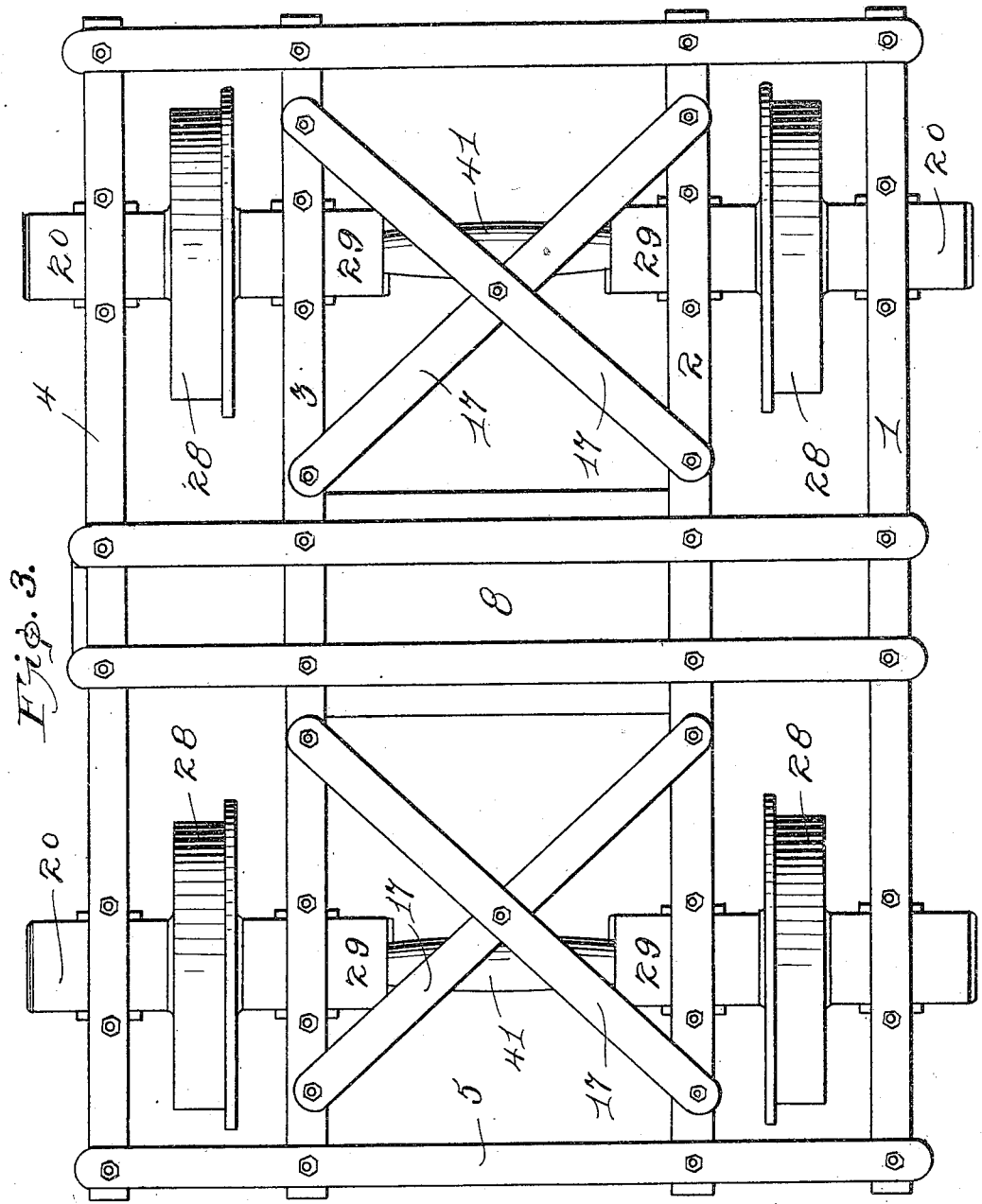

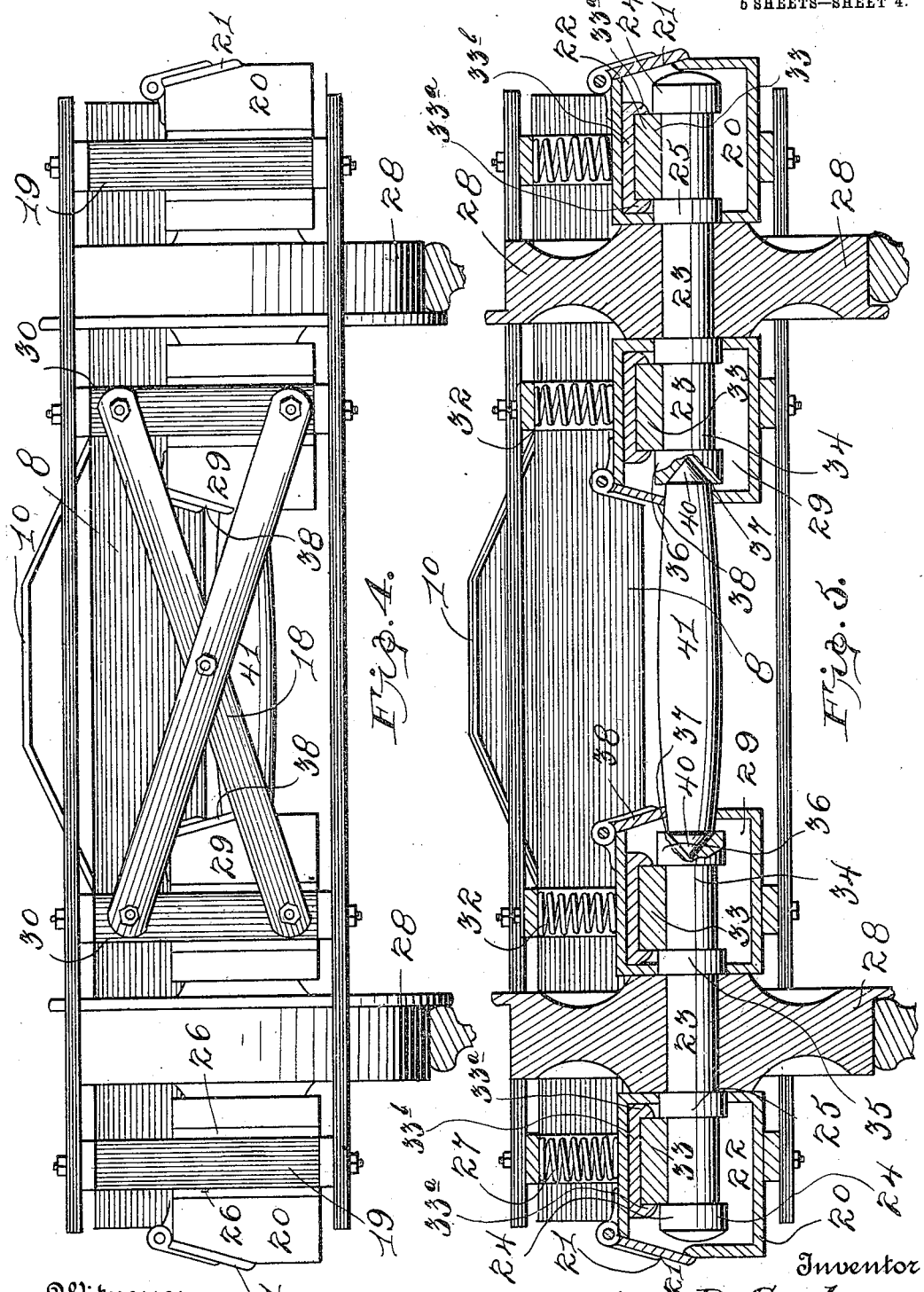

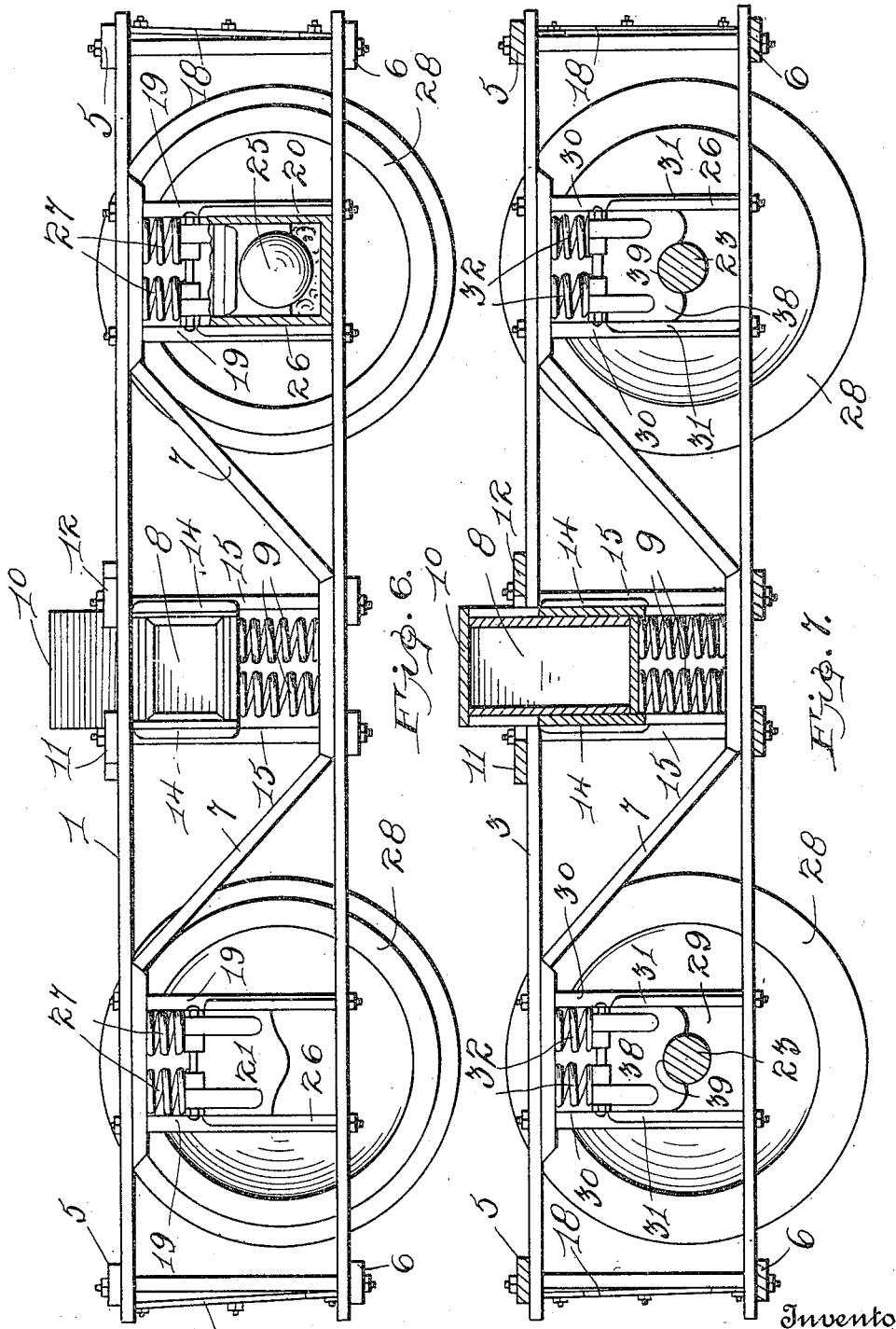

UNITED STATES PATENT OFFICE.

JOHN B. SEELY, OF HAMMONTON, NEW JERSEY, ASSIGNOR OF ONE-THIRD TO EDWARD W. STRICKLAND, OF HAMMONTON, NEW JERSEY, AND ONE-THIRD TO GEORGE KING, OF PHILADELPHIA, PENNSYLVANIA.

CAR-TRUCK.

953,555.  Specification of Letters Patent.  Patented Mar. 29, 1910.

Application filed October 6, 1909. Serial No. 521,226.

*To all whom it may concern:*

Be it known that I, JOHN B. SEELY, a citizen of the United States of America, residing at Hammonton, in the county of Atlantic and State of New Jersey, have invented certain new and useful Improvements in Car-Trucks, of which the following is a specification, reference being had therein to the accompanying drawing.

This invention relates to car trucks, and the principal object of the same is to provide separate and independent bearings for each wheel so that the friction incidental to rounding curves is greatly reduced, and also to permit any of the wheels to be readily removed and new ones substituted therefor without interfering in any way with the other wheels.

The invention also contemplates the provision of a strongly-braced frame in which bearings for each wheel and the central bolster for the center bearing are yieldingly mounted.

In connection with the foregoing, the invention also contemplates employing novel equalizing bars which connect the inner bearing of each oppositely-disposed wheel, so that lateral play thereof is prevented.

In carrying out the objects of the invention generally stated above, it will be understood, of course, that the essential features of the same are necessarily susceptible of changes in details and structural arrangements, one preferred and practical embodiment of which is shown in the accompanying drawing, wherein:

Figure 1 is a perspective view of the improved truck. Fig. 2 is a top plan view. Fig. 3 is a bottom plan view. Fig. 4 is an end view. Fig. 5 is a vertical transverse sectional view taken on the line 5—5, Fig. 2. Fig. 6 is a side elevation. Fig. 7 is a vertical longitudinal sectional view taken on the line 7—7, Fig. 2.

Referring to said drawings by numerals, it will be observed that the improved truck is composed of spaced apart longitudinal side frames 1—2 and 3—4, the frames 1 and 4 being the outer ones and the frames 2 and 3 being the inner ones, said frames being connected by the upper and lower end bars 5—6. The four longitudinally-arranged frames 1, 2, 3 and 4, are arranged in pairs, two to a side, and each frame is braced by the truss bars 7. A transversely-arranged, centrally-located bolster 8 is mounted on springs 9 carried by the lower part of said frames 1, 2, 3 and 4, said bolster having a flat upwardly-projecting central portion 10 which projects between and above two centrally-located, spaced-apart transverse bars 11—12, which extend across the tops of said frames 1, 2, 3 and 4. Said bolster is provided with the usual pivot opening 13 for the center bearing plates (not shown). As will be obvious, a limited vertical movement of the bolster is permitted between the upper and lower members of said longitudinal frames, the bolster being guided in such movements by its side strips or cleats 14 which engage the edges of the guide bars 15 of said frames. The inner frames 2 and 3 are connected by the upper and lower brace bars 16—17, said brace bars being arranged in crossing relation, and the ends of said frames 2 and 3 are also connected by the crossed brace bars 18.

In the example of the invention shown in the accompanying drawing, a four-wheel truck has been illustrated and to provide independent bearings for each wheel, the frames 1, 2, 3 and 4 have been each shown with two bearings. The outer frames 1 and 4 are provided adjacent their ends with vertically-arranged guide bars 19 between which a bearing box 20 is mounted, said box 20 projecting outwardly and provided with the usual door 21. Internally each box is provided with the usual brasses 22 which engage the upper surface of the outer end of the axle 23 between the two collars 24—25. The usual space is left below the axle for waste and lubricating material. The boxes have side strips 26 which engage the guide bars 18 to confine the movements of the boxes to a vertical one. Springs 27 are interposed between the top surface of each box and the top members of their frames. Each axle 23 is provided with the usual flanged wheel 28, the inner end of each axle projecting into a bearing box 29 slidably mounted between the guide bars 30 of the inner frames and equipped with strips 31 which engage said bars 30, similar to that described in connection with the outer boxes. Springs 32 are interposed between said boxes 29 and the top of their frames, and internally each box is provided with the brasses 33 which are supported between the end lugs 33ª of a plate 33ᵇ carried by the top of the inner surface of the top of each box, said brasses being supported so that they engage with the inner end 34 of the axles 23 between the collars 35—36 formed thereon, and thereby prevent too much lateral play of the wheels carried by said axles, as will be readily understood. The end collar 36 of the inner end of each axle 23 is provided with a recess 37, preferably, tapering. A door 38 is provided for the inner boxes, each door being slotted as indicated at 39 to permit the tapering end 40 of an equalizing bar 41 to be passed therethrough and into the recess 37 of the end collar 36. As will be obvious, the bars 41 prevent lateral movement of the axles 23.

It will be seen from the foregoing that the described construction of the truck provides a strong and serviceable frame in which each wheel is independently mounted.

What I claim as my invention is:

1. A car truck comprising supporting frames, independently journaled axles for said frames, the inner ends of said axles being recessed, a wheel for each axle, and an equalizing bar having its ends fitted in the recessed inner ends of said axles to prevent lateral movement thereof.

2. A car truck comprising supporting frames, journal boxes yieldably mounted thereon, said boxes arranged in pairs the members of which are oppositely disposed, an axle for each pair of boxes, and an equalizing bar connecting the inner end of the axles.

3. A car truck comprising supporting frames arranged in parallel pairs at each side of the frame, journal boxes for each frame, the boxes of each pair of frames being oppositely disposed, an axle journaled in each pair of boxes, and equalizing means connecting the inner end of the axles at one side of the truck with the inner end of the axles at the other side of the truck.

4. A car truck comprising supporting frames, independently journaled axles for said frames, a wheel for each axle, and equalizing means engaging the inner ends of said axles for the purpose of preventing lateral movement thereof.

5. A car truck comprising supporting frames, oppositely disposed independently journaled axles for said frames, and equalizing means having a direct connection with said oppositely-disposed axles for the purpose of preventing lateral movement of said axles.

In testimony whereof I hereunto affix my signature in presence of two witnesses.

JOHN B. SEELY.

Witnesses:
   Wm. A. Sutphen,
   Gustave W. Shaedle.